United States Patent
Lin

(10) Patent No.: US 8,804,251 B2
(45) Date of Patent: Aug. 12, 2014

(54) ACCURATE AUTO-FOCUS METHOD

(71) Applicant: Hon Hai Precision Industry Co., Ltd., New Taipei (TW)

(72) Inventor: Kuo-Hung Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/777,064

(22) Filed: Feb. 26, 2013

(65) Prior Publication Data
US 2014/0153120 A1 Jun. 5, 2014

(30) Foreign Application Priority Data
Nov. 30, 2012 (TW) .............................. 101145055 A

(51) Int. Cl.
*G02B 7/28* (2006.01)
*G02B 7/38* (2006.01)

(52) U.S. Cl.
CPC ...................................... *G02B 7/38* (2013.01)
USPC ........................................................ 359/698

(58) Field of Classification Search
CPC .......... G02B 7/282; G02B 7/287; G02B 7/36; G02B 7/38; G03B 13/36
USPC ............................... 359/679, 698; 396/80–82
See application file for complete search history.

(56) References Cited

U.S. PATENT DOCUMENTS 8,520,130 B2 * 8/2013 Sasaki .......................... 348/345

\* cited by examiner

*Primary Examiner* — Joseph P Martinez
(74) *Attorney, Agent, or Firm* — Novak Druce Connolly Bove + Quigg LLP

(57) ABSTRACT

An auto focus method includes: assigning searching boundaries L=InitL, R=InitR, and acquiring the resolutions f(L), f(R); defining the focused positions $X_1$, $X_2$ by the golden section method, and acquiring the resolution $f(X_1)$, $f(X_2)$; determining whether or not $f(X_1)$ is greater than $f(X_2)$; moving L adjacent to R when f(x1) is less than f(x2); moving R adjacent to L when f(x1) is greater than f(x2); acquiring the focused positions L, x1, x2, and R, and the resolution of the focused positions when L≠InitL and R≠InitR; acquiring an optimal focus point according to the focused positions L, $X_1$, $X_2$, and R, and the resolution of the focused positions.

8 Claims, 4 Drawing Sheets

S181

Orderly sampling three groups of the focus positions and the resolutions from the focus positions L, $X_1$, $X_2$, and R and the resolutions $f(L)$, $f(X_1)$, $f(X_2)$, and $f(R)$, and substituting each three groups of the focus positions and the resolutions into a parabolic equation to calculate four groups of peak coordinates $(X_{n1}, f(n1))$, $(X_{n2}, f(n2))$, $(X_{n3}, f(n3))$, $(X_{n4}, f(n4))$

S182

Acquiring the optimal focus position
$X_p = (L*f(L) + X_1*f(X_1) + X_2*f(X_2) + R*f(R) + X_{n1}*f(n1) + X_{n2}*f(n2) + X_{n3}*f(n3) + X_{n4}*f(n4))/(L + X_1 + X_2 + R + X_{n1} + X_{n2} + X_{n3} + X_{n4})$

FIG. 3

ACCURATE AUTO-FOCUS METHOD

BACKGROUND

1. Technical Field

The present disclosure relates to auto-focus technologies, and particularly to an auto-focus method capable of accurately finding a focused position.

2. Description of Related Art

Auto-focus methods are used in a camera to find a focused position. An auto-focus method utilizes a mountain climbing algorithm, in which a focusing lens of the camera is driven to make a step by step global search. The image resolution of the lens at each step is acquired to plot a curve of the image resolution relative to the step of the focusing lens, and then the step associated with the highest image resolution is taken as the focused position. However, if there is a slightly shake occurring during the focusing, the curve may distort, disabling the mountain climbing algorithm to find the real highest image contrast and resulting in an inaccurate focusing result.

Therefore, it is desirable to provide an auto-focus method, which can overcome the limitations described.

BRIEF DESCRIPTION OF THE DRAWINGS

FIG. 3 is a flowchart of calculating an optimal focused position of the auto-focus method of FIG. 1.

DETAILED DESCRIPTION

Embodiments of the disclosure will be described with reference to the drawings.

Figure 1:
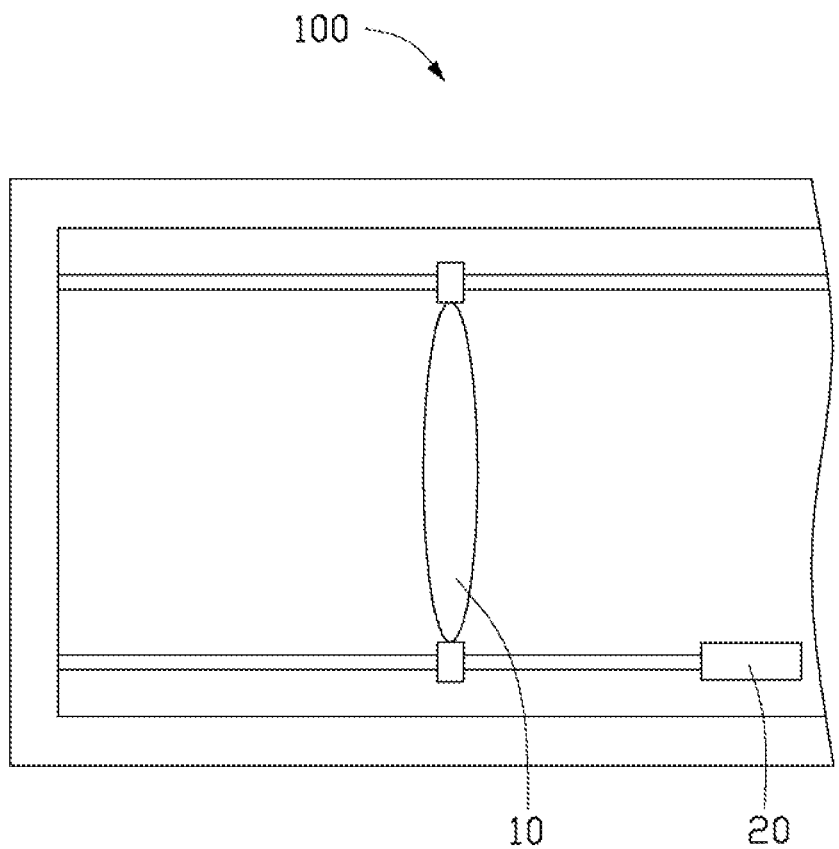
FIG. 1 is a cross-sectional schematic view of a lens module in accordance with an exemplary embodiment.

Referring to FIG. 1, an auto-focus method, according to an exemplary embodiment, is used in an electronic device, such as camera and telephone, including a lens module 100. The lens module 100 includes a focusing lens 10 and a motor 20 for driving the focusing lens 10 to move within a focus range of the lens module 100. A resolution (i.e. contrast) of an image captured by the lens module 100 is changed with a position of the focusing lens 10.

Figure 2:
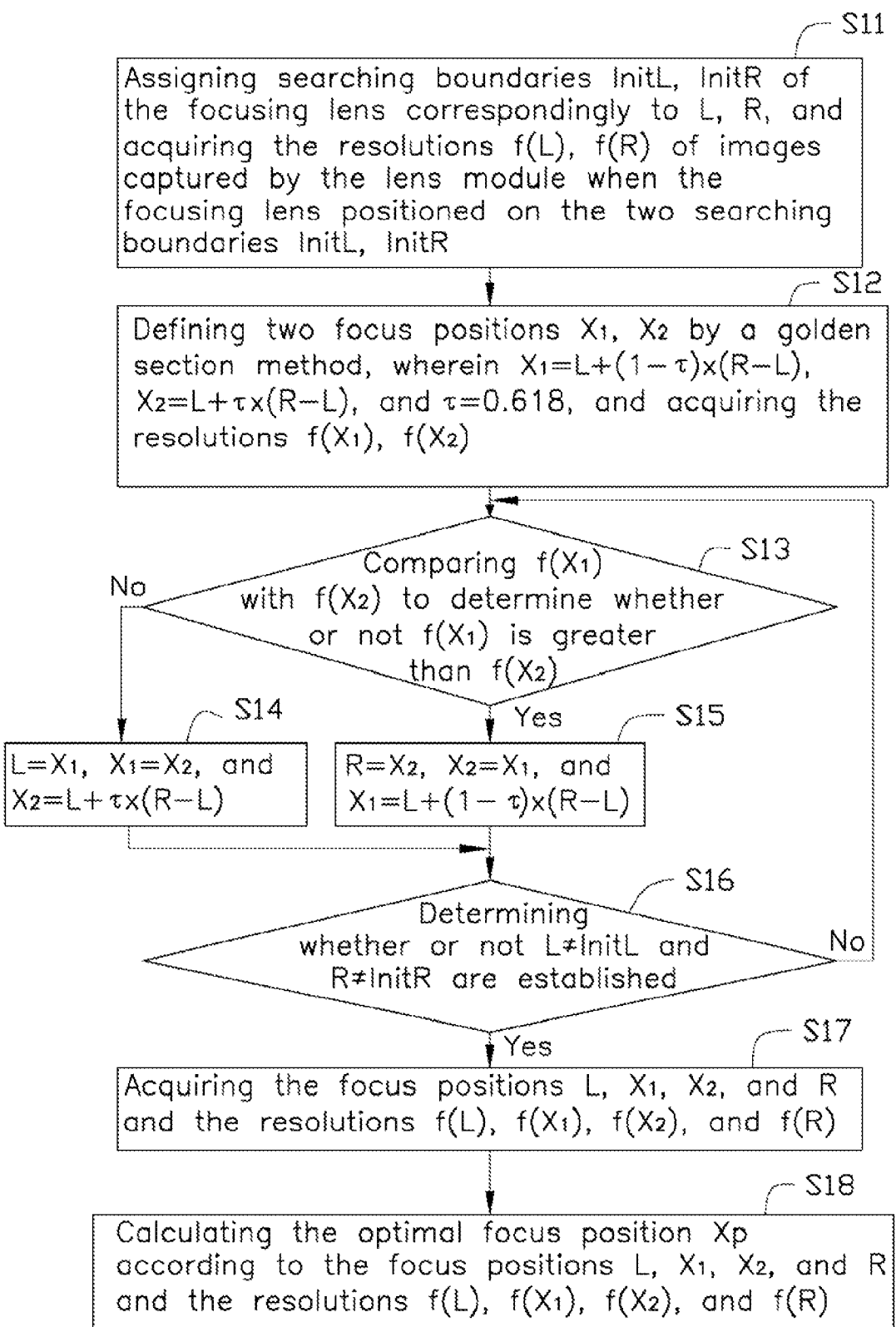
FIG. 2 is a flowchart of an auto-focus method in accordance with an exemplary embodiment.
Figure 4:
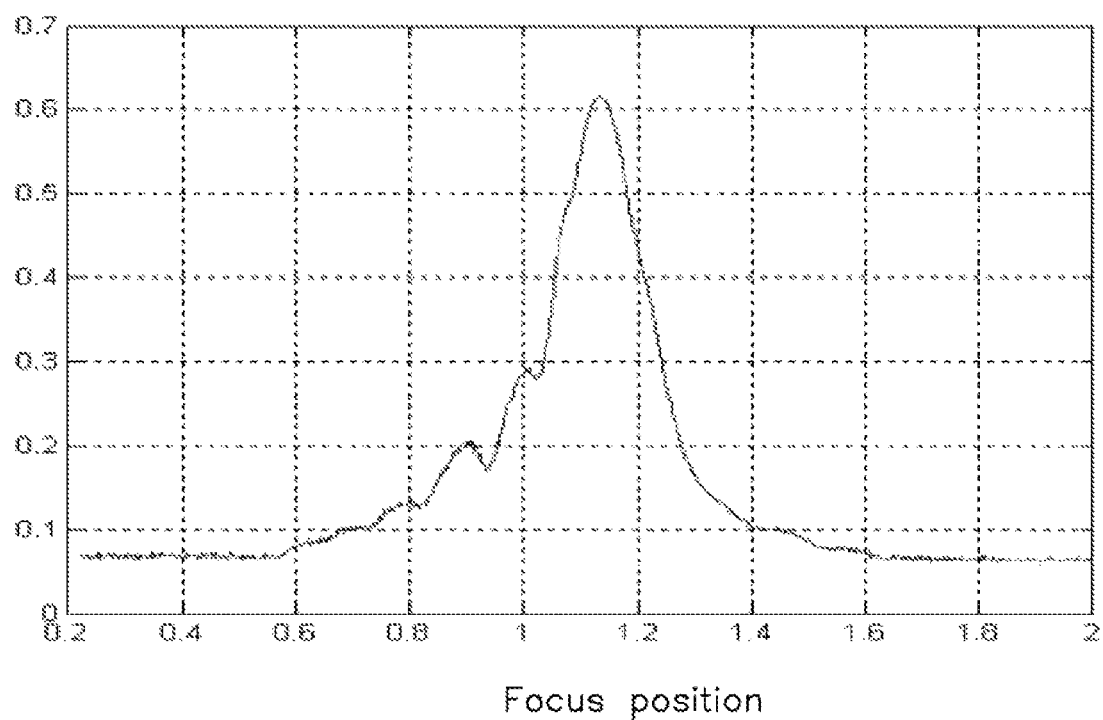
FIG. 4 is a coordinate graph of a resolution value and a current value of the auto-focus method of FIG. 1.

Referring to FIGS. 2-4, the auto-focus method may be implemented by software modules encoded via a program language, such as C++ or hardware constructed to have the corresponding function. In the former case, the software modules can be stored in a memory and run by a processor. The auto-focus method includes steps S11-S18.

In step S11: searching boundaries InitL, InitR of a searching range of the focusing lens 10 are represented by L, R. The resolutions of images captured by the lens module 100 are represented by f(L), f(R) when the focusing lens 10 positioned on the two searching boundaries InitL, InitR respectively. Wherein L and R are variables, InitL and InitR are constants. f(X) is the resolution of the image captured by the lens module 100 when the focusing lens 10 positioned on a focused position X, wherein X is a variable greater than InitL and lower than InitR. The focused position X is a current value used for driving the motor 20. The searching boundaries InitL, InitR are determined according to the designed requirements of the lens module 100. In this embodiment, L=InitL=0.2A, R=InitR=2A, f(L)=0.07, and f(R)=0.07.

In step S12: two focused positions $X_1$, $X_2$ are defined by a golden section method, wherein $X_1=L+(1-\tau)\times(R-L)$, $X_2=L+\tau\times(R-L)$, and $\tau=0.618$. $f(X_1)$ and $f(X_2)$ are the resolution of the images captured by the lens module 100 when the focusing lens 10 positioned on the focused positions $X_1$, $X_2$. Wherein $X_1$ and $X_2$ are variables. In the embodiment, $X_1=0.8696$, $X_2=1.3124$, $f(X_1)=0.19$, $f(X_2)=0.15$.

In step S13: $f(X_1)$ is compared with $f(X_2)$ to determine whether or not $f(X_1)$ is greater than $f(X_2)$ when $f(X_1)$ is lower than $f(X_2)$, entering into step S14. When $f(X_1)$ is greater than $f(X_2)$, entering into step S15. In the embodiment, $f(X_1)$ is greater than $f(X_2)$.

In step S14: when $f(X_1)$ is lower than $f(X_2)$, $L=X_1$, $X_1=X_2$, and $X_2=L+\tau\times(R-L)$. Wherein $L \neq X_1$ represents that $X_1$ is assigned to L, $X_1=X_2$ represents that $X_2$ is assigned to $X_1$, and $X_2=L+\tau\times(R-L)$ represents that $X_2$ is defined via reassigned L.

In step S15: when $f(X_1)$ is greater than $f(X_2)$, $R=X_2$, $X_2=X_1$, and $X_1=L+(1-\tau)\times(R-L)$. Wherein $R=X_2$ represents that $X_2$ is assigned to R, $X_1=X_2$ represents that $X_2$ is assigned to $X_1$, and $X_1=L+(1-\tau)\times(R-L)$ represents that $X_1$ is defined via reassigned R. In the embodiment, R=1.3124, $X_2=0.8696$, and $X_1=0.6138$.

In step S16: L≠InitL and R≠InitR are determined whether or not are established. When L≠InitL and R≠InitR are unestablished, returning to step S13. In this embodiment, as the value of L is unchanged, L≠InitL and R≠InitR are unestablished.

In step S17: when L≠InitL and R≠InitR are established, the focused positions L, $X_1$, $X_2$, and R and the resolutions f(L), $f(X_1)$, $f(X_2)$, and f(R) of images captured by the lens module 100 when the focusing lens 10 are positioned on the focused positions L, $X_1$, $X_2$, and R are acquired. It should understand that, the step S14 and the step S15 will respectively be run at least one time when L≠InitL and R≠InitR are established.

In step S18: an optimal focused position $X_p$ is calculated according to the focused positions L, $X_1$, $X_2$, and R and the resolutions f(L), $f(X_1)$, $f(X_2)$, and f(R). The calculating process comprises the steps:

In step S181: three groups of the focused positions and the resolutions are orderly sampled from the focused positions L, $X_1$, $X_2$, and R and the resolutions f(L), $f(X_1)$, $f(X_2)$, and f(R). Each three groups of the focused positions and the resolutions are substituted into a parabolic equation to calculate a peak coordinate. Therefore, four peak coordinates $(X_{n1}, f(n1))$, $(X_{n2}, f(n2))$, $(X_{n3}, f(n3))$, $(X_{n4}, f(n4))$ are calculated.

In step S182: the optimal focused position $X_p$ is acquired, wherein $X_p=(L*f(L)+X_1*f(X_1)+X_2*f(X_2)+R*f(R)+X_{n1}*f(n1)+X_{n2}*f(n2)+X_{n3}*f(n3)+X_{n4}*f(n4))/(L+X_1+X_2+R+X_{n1}+X_{n2}+X_{n3}+X_{n4})$.

It should be understood that, the optimal focused position $X_p$ can be calculated by other methods, such as $X_p=(L*f(L)+X_1*f(X_1)+X_2*f(X_2)+R*f(R))/(L+X_1+X_2+R)$, or $X_p=(X_{n1}*f(n1)+X_{n2}*f(n2)+X_{n3}*f(n3)+X_{n4}*f(n4))/(X_{n1}+X_{n2}+X_{n3}+X_{n4})$.

The searching boundaries R, L move toward the optimal focused position $X_p$ by the golden section method, and the optimal focused position $X_p$ is calculated according to the focused positions L, $X_1$, $X_2$, and R and the resolutions f(L), $f(X_1)$, $f(X_2)$, and f(R). Therefore, the accuracy of the optimal focused position $X_p$ is increased.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An auto-focus method configured for controlling a focusing lens of a lens module to move to an optimal focused position $X_p$, comprising:
   assigning searching boundaries InitL, InitR of the focusing lens to L, R respectively;
   acquiring the resolutions f(L), f(R) of images captured by the lens module when the focusing lens is positioned on the two searching boundaries InitL, InitR, wherein f(X) represents the resolution of the image captured by the lens module when the focusing lens is positioned on a focused position X, X is a variable value greater than InitL and lower than InitR;
   defining two focused positions $X_1$, $X_2$, wherein $X_1=L+(1-\tau)\times(R-L)$, $X_2=L+\tau\times(R-L)$, and $\tau=0.618$;
   acquiring the resolutions $f(X_1)$, $f(X_2)$;
   comparing $f(X_1)$ with $f(X_2)$ to determine whether or not $f(X_1)$ is greater than $f(X_2)$;
   determining that $L=X_1$, $X_1=X_2$, and $X_2=L+\tau\times(R-L)$ when $f(X_1)$ is lower than $f(X_2)$;
   determining that $R=X_2$, $X_2=X_1$, and $X_1=L+(1-\tau)\times(R-L)$ when $f(X_1)$ is greater than $f(X_2)$;
   determining whether or not L≠InitL and R≠InitR are established;
   acquiring the focused positions L, $X_1$, $X_2$, and R and the resolutions f(L), $f(X_1)$, $f(X_2)$, and f(R) when L≠InitL and R≠InitR are established; and
   calculating the optimal focused position $X_p$ according to the focused positions L, $X_1$, $X_2$, and R and the resolutions f(L), $f(X_1)$, $f(X_2)$, and f(R).

2. The auto-focus method of claim 1, wherein L and R are variables, InitL and InitR are constants, and $X_1$ and $X_2$ are variables.

3. The auto-focus method of claim 1, further comprising: returning to compare $f(X_1)$ with $f(X_2)$ when L≠InitL and R≠InitR are unestablished.

4. The auto-focus method of claim 1, wherein calculating the optimal focused position $X_p$ comprises:
   orderly sampling three groups of the focused positions and the resolutions from the focused positions L, $X_1$, $X_2$, and R and the resolutions f(L), $f(X_1)$, $f(X_2)$, and f(R), and substituting each three groups of the focused positions and the resolutions into a parabolic equation to calculate four groups of peak coordinates ($X_{n1}$, f(n1)), ($X_{n2}$, f(n2)), ($X_{n3}$, f(n3)), ($X_{n4}$, f(n4)); and
   acquiring the optimal focused position $X_p$ according to:
   $X_p=(L*f(L)+X_1*f(X_1)+X_2*f(X_2)+R*f(R)+X_{n1}*f(n1)+X_{n2}*f(n2)+X_{n3}*f(n3)+X_{n4}*f(n4))/(L+X_1+X_2+R+X_{n1}+X_{n2}+X_{n3}+X_{n4})$.

5. The auto-focus method of claim 1, wherein calculating the optimal focused position $X_p$ is according to: $X_p=(L*f(L)+X_1*f(X_1)+X_2*f(X_2)+R*f(R))/(L+X_1+X_2+R)$.

6. The auto-focus method of claim 1, wherein calculating the optimal focused position $X_p$ comprises:
   orderly sampling three groups of the focused positions and the resolutions from the focused positions L, $X_1$, $X_2$, and R and the resolutions f(L), $f(X_1)$, $f(X_2)$, and f(R), and substituting each three groups of the focused positions and the resolutions into a parabolic equation to calculate four groups of peak coordinates ($X_{n1}$, f(n1)), ($X_{n2}$, f(n2)), ($X_{n3}$, f(n3)), ($X_{n4}$, f(n4)); and
   acquiring the optimal focused position $X_p$ according to:
   $X_p=(X_{n1}*f(n1)+X_{n2}*f(n2)+X_{n3}*f(n3)+X_{n4}*f(n4))/(X_{n1}+X_{n2}+X_{n3}+X_{n4})$.

7. The auto-focus method of claim 1, wherein $L=X_1$ represents that $X_1$ is assigned to L, $X_1=X_2$ represents that $X_2$ is assigned to $X_1$, and $X_2=L+\tau\times(R-L)$ represents that $X_2$ is defined via reassigned L.

8. The auto-focus method of claim 1, wherein $R=X_2$ represents that $X_2$ is assigned to R, $X_1=X_2$ represents that $X_2$ is assigned to $X_1$, and $X_1=L+(1-\tau)\times(R-L)$ represents that $X_1$ is defined via reassigned R.

* * * * *